UNITED STATES PATENT OFFICE.

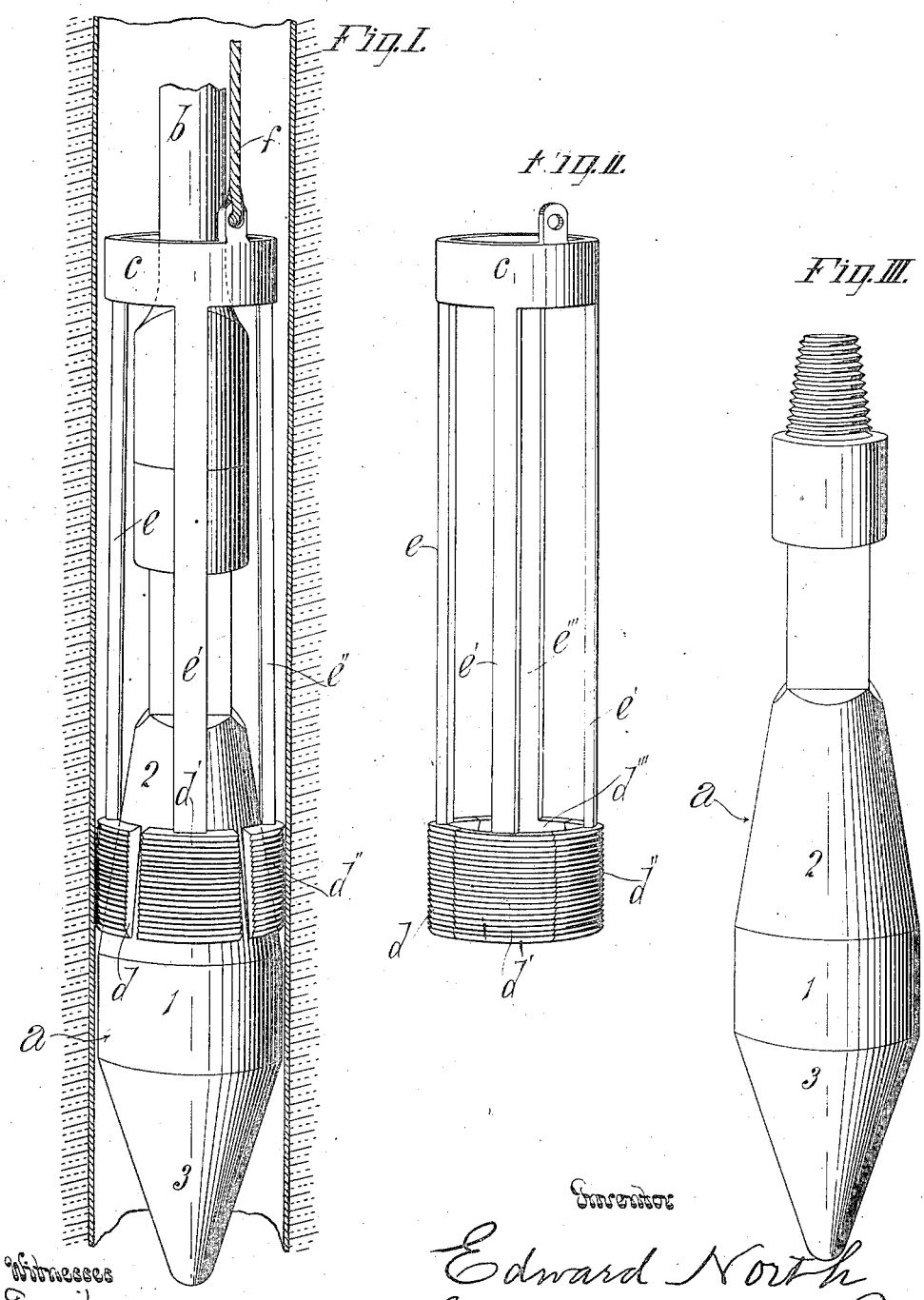

EDWARD NORTH, OF LOS ANGELES, CALIFORNIA.

COMBINED SWAGE AND CASING-SPEAR.

SPECIFICATION forming part of Letters Patent No. 695,169, dated March 11, 1902.

Application filed September 15, 1900. Serial No. 30,177. (No model.)

*To all whom it may concern:*

Be it known that I, EDWARD NORTH, a citizen of the United States, residing at Los Angeles, in the county of Los Angeles and State of California, have invented a new and useful Combined Swage and Casing-Spear, of which the following is a specification.

An object of my invention is to provide a casing-spear so constructed that a part of the same can be independently used as a swage to straighten the casing and then the casing-spear can be completed while the swage is in the casing and can then be operated as a casing-spear to then withdraw the casing, so that the operation of swaging the casing can be performed without any interference by reason of the casing-spear attachment, and as soon as the casing has been straightened by the swage the workman can apply the necessary parts to constitute with the swage a casing-spear inside the casing without first withdrawing the swage.

Another object attained by this invention is that the swaging and withdrawing of the casing is accomplished by practically one tool, and therefore the expense of two tools is avoided and a great economy in time is also gained.

The object of my invention is to provide superior, more economical, convenient, and effective means for removing casings from wells.

In the use of casing-spears it is usually necessary to first employ a swage for straightening the casing before the spear is lowered into the casing. In my invention I propose to utilize the swage as the mandrel of the casing-spear, thereby greatly cheapening the appliances necessary for the operation of lifting or drawing the casing.

It often occurs that a casing requires to be straightened by a swage without having to be afterward withdrawn, and it is therefore necessary to have a swage which can be used independently of the casing-spear.

An object of my invention is to provide a casing-spear which is so constructed that the spearing appliance need not be put into the casing or used in connection with the swage except when it is necessary to operate with the casing-spear. By my invention the slips, which are constructed at far less cost than the ordinary casing-spear and which are much lighter than the ordinary casing-spear, will be simply an adjunct to the swage proper, and the swage will ordinarily be used as an ordinary swage, and the slips will be stored until the casing-spear is required. Then they can be applied while the swage is in the casing and, together with the swage, will immediately constitute a casing-spear for withdrawing the casing.

Another object of my invention is to construct a casing-spear of extremely simple construction, which can be readily controlled to positively take hold and let go of the casing whenever and wherever desired, and which is extremely easy of operation.

Another object of my invention is to obviate the necessity of withdrawing the swage and removing it from the tools in order to use the casing-spear and to avoid the loss of time incurred by such operation.

The accompanying drawings illustrate my invention.

Figure I is a perspective view of my newly-invented casing-spear in the casing of a well, a fragment of which casing is shown in longitudinal mid-section. A fragment of the tools is shown in place. Fig. II is a perspective view of the slips and their supporting-ring removed from the mandrel-body. Fig. III is a view of the mandrel detached.

The mandrel for my newly-invented casing-spear comprises an upwardly-tapering body $a$, which has a straight cylindrical mid-portion 1, an upwardly-tapering conical portion 2, and a downwardly-tapering conical point 3.

$b$ indicates the tools, the same constituting the means for raising and lowering the said tapering body or mandrel.

$c$ indicates a ring which surrounds the tools and is adapted to slide up and down in the casing above the mandrel.

$d$ $d'$ $d''$ $d'''$ indicate a set of slips to fit inside the casing and around said upwardly-tapering body and adapted to be expanded by the conical portion 2 of said body.

$e$ $e'$ $e''$ $e'''$ indicate rods respectively connecting the slips with the ring and holding the slips at a determined distance below said ring. The slips are corrugated or otherwise roughened on the periphery in a manner common with casing-spears for the purpose of taking hold of the casing when expanded by the conical body. The rods are preferably spring-rods, with a tendency to hold the slips contracted to a diameter less than that of the casing they are intended to fit, and the slips taper to correspond with the taper of the upwardly-extending cone 2 of the body.

It is to be understood that I do not limit myself to the number or the particular form of the slips shown in the drawings. Any other desired number may be used and any form may be employed which is found suitable, the important feature of my invention being that the slips and the expanding mandrel are operated independently of each other, as hereinafter fully explained.

f indicates the sand-line for raising and lowering the slips. It is preferably fastened to the top of the slip-supporting ring, as shown in the drawings.

Preferably the rods will be welded to the slips and also to the ring and will have an inward tension to hold the slips together, so that they will readily pass down the casing without contact therewith.

Preferably the swage or mandrel is provided with a downwardly-tapering point 3, as shown; but it is to be understood that I do not limit myself to the particular form of mandrel shown, and I may use a bit or any other tool or appliance that will answer the purpose, the same being furnished with a taper portion to answer the purpose of the portion marked 2 in the drawings.

In practical operation the mandrel or swage a will be lowered to the place where it is desired to take hold of the casing, and as it passes down it serves the same purpose as that served by the ordinary swage in the former practice of the art. Then the slips will be lowered to rest on the conical portion or shoulder 2 of the mandrel, and they are thus expanded against the casing. Then the mandrel is drawn up, thus wedging the slips into forcible contact with the casing. The taper of the mandrel and the slips is such that the mandrel can be drawn up into such forcible contact with the slips that the mandrel will be supported by its friction with the slips, which in turn are supported by their friction with the casing, thus allowing the mandrel to be held by friction from lowering when the tools are lowered for the purpose of jarring. When the mandrel has been drawn up tightly, so that it will not fall down, the operator will operate the jars upward to loosen the casing and force it up.

When it is desired to release the spear, the jars are operated to force the mandrel down out of its contact with the slips. As soon as the mandrel has been withdrawn from the slips the slips and the mandrel can be drawn separately up out of the casing.

What I claim, and desire to secure by Letters Patent of the United States, is—

1. A combined swage and casing-spear comprising a swage tapering at its upper end; means for raising and lowering the same; a set of slips to fit inside the casing and around said swage and adapted to be expanded by the upwardly-tapering portion of said swage; a ring which will pass freely up and down around the support of the swage; means connecting the slips with said ring; and means for lowering the slips into the well above the swage and withdrawing it out of the well independently of the swage or the tools thereto attached.

2. In a combined swage and casing-spear, the combination with a swage tapering at its upper end, of a set of slips, and means for applying the slips to and withdrawing them from the swage after the swage has been lowered into the well-casing.

In testimony whereof I have signed my name to this specification, in the presence of two subscribing witnesses, at Los Angeles, California, this 8th day of September, 1900.

EDWARD NORTH.

Witnesses:
  JAMES R. TOWNSEND,
  JULIA TOWNSEND.